(12) United States Patent
Kuo et al.

(10) Patent No.: US 12,511,381 B2
(45) Date of Patent: Dec. 30, 2025

(54) EVENT REPORTING METHOD, SECURITY MANAGEMENT CIRCUIT, AND MANAGEMENT SYSTEM

(71) Applicant: ASPEED Technology Inc., Hsinchu (TW)

(72) Inventors: Chin-Ting Kuo, Hsinchu (TW); Chia-Wei Wang, Hsinchu (TW); Hung Liu, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 145 days.

(21) Appl. No.: 18/518,623

(22) Filed: Nov. 24, 2023

(65) Prior Publication Data
US 2024/0320328 A1   Sep. 26, 2024

(30) Foreign Application Priority Data

Mar. 24, 2023   (TW) .................................. 112111030
Aug. 11, 2023   (TW) .................................. 112130216

(51) Int. Cl.
*G06F 21/43*   (2013.01)
*G06F 21/55*   (2013.01)

(52) U.S. Cl.
CPC ...... *G06F 21/554* (2013.01); *G06F 2221/034* (2013.01)

(58) Field of Classification Search
CPC .............. G06F 21/554; G06F 2221/03; G06F 2221/034
(Continued)

(56) References Cited

U.S. PATENT DOCUMENTS

| 9,460,286 B1 * | 10/2016 | Felstaine | ............. | H04L 63/1441 |
| 9,959,288 B2 * | 5/2018 | Kumar | .................... | G06F 16/11 |

(Continued)

FOREIGN PATENT DOCUMENTS

| CN | 106888191 | 6/2017 |
| CN | 108777016 | 11/2018 |

(Continued)

OTHER PUBLICATIONS

"Office Action of Taiwan Counterpart Application", issued on Sep. 25, 2024, p. 1-p. 9.
(Continued)

*Primary Examiner* — Bharat Barot
(74) *Attorney, Agent, or Firm* — JCIPRNET (57) ABSTRACT

An event reporting method, a security management circuit, and a management system are provided. The management system includes first, second, and third security management circuits. The first security management circuit and the second security management are respectively located at a first layer and a second layer of a hierarchy structure. The third security management circuit is located at another layer of the hierarchy structure different from the first layer and the second layer. The first, second, and third security management circuits are respectively configured to determine an event occurring on a host connected to these security management circuits. A dedicated line is communicatively connected between the first and third security management circuits. According to a type of the event determined by the third security management circuit, the third security management circuit reports the event through the dedicated line. Accordingly, a reporting efficiency and system security are improved.

15 Claims, 5 Drawing Sheets

(58) Field of Classification Search
USPC .................................................. 726/22–25
See application file for complete search history.

(56) References Cited

U.S. PATENT DOCUMENTS

| | | | |
|---|---|---|---|
| 10,284,587 B1 | 5/2019 | Schlatter et al. | |
| 10,839,080 B2 | 11/2020 | Khessib et al. | |
| 10,951,633 B1 * | 3/2021 | Shulman-Peleg | G06F 21/554 |
| 2015/0222656 A1 * | 8/2015 | Haugsnes | G06F 21/552 |
| | | | 726/23 |

FOREIGN PATENT DOCUMENTS

| | | |
|---|---|---|
| TW | M594314 | 4/2020 |
| TW | 202305632 | 2/2023 |

OTHER PUBLICATIONS

"Office Action of Taiwan Counterpart Application", issued on Apr. 28, 2025, p. 1-p. 9.

* cited by examiner

EVENT REPORTING METHOD, SECURITY MANAGEMENT CIRCUIT, AND MANAGEMENT SYSTEM

CROSS-REFERENCE TO RELATED APPLICATION

This application claims the priority benefit of Taiwan application serial no. 112111030, filed on Mar. 24, 2023, and Taiwan application serial no. 112130216, filed on Aug. 11, 2023. The entirety of each of the above-mentioned patent applications is hereby incorporated by reference herein and made a part of this specification.

BACKGROUND

Technical Field

The disclosure relates to an information security technology; more particularly, the disclosure relates to an event reporting method, a security management circuit, and a management system.

Description of Related Art

A trusted platform management unit (TPMU) is a security control center of a platform or the entire system and may serve as a root of trust (RoT) of the platform. In addition, after a host boots up, the TPMU may verify the integrity of system data executed on the platform and monitor a data flow or a status of a processor on a bus, at the same time, the TPMU can also be used to detect physical malicious attacks on the platform.

Platform firmware resilience (PFR) refers to another security control chip based on TPMU. The PFR may be applied to ensure that executable image files can be trusted. If there is any invalid firmware or malicious executable image file or binary format file, the PFR stops a boot up sequence during an early boot up stage.

It is worth noting that with the rapid evolution of security requirements, one single device or one single motherboard may be equipped with a plurality of ROTs, PFR circuits, or devices. Therefore, how to effectively and safely manage signal transfer between these circuits is a concern to which developers or researchers pay attention.

SUMMARY

In view of the above, the disclosure provides an event reporting method, a security management circuit, and a management system capable of improving efficiency of reporting events between circuits and enhancing system security.

In an embodiment of the disclosure, an event reporting method is provided, and the event reporting method includes but is not limited to following steps. A hierarchy structure is provided, where the hierarchy structure includes at least three layers. A first security management circuit is located at a first layer of the hierarchy structure, a second security management circuit is located at a second layer of the hierarchy structure, and a third security management circuit located at another layer of the hierarchy structure different from the first layer and the second layer. The first security management circuit is communicatively connected the second security management circuit, the second security management circuit is communicatively connected the third security management circuit, and the first security management circuit, the second security management circuit, and the third security management circuit are respectively configured to determine an event occurring on a host connected to the first security management circuit, the second security management circuit, and the third security management circuit. A dedicated line communicatively connected between the first security management circuit and the third security management circuit is provided. According to a type of the event determined by the third security management circuit, the event is reported through the dedicated line.

In an embodiment of the disclosure, a third security management circuit located at a layer of a hierarchy structure different from other two layers of the hierarchy structure is provided. Here, the hierarchy structure includes at least three layers, a first security management circuit is located at a first layer of the hierarchy structure, a second security management circuit is located at a second layer of the hierarchy structure, the second security management circuit is communicatively connected the third security management circuit, and the first security management circuit is communicatively connected to the second security management circuit. The third security management circuit includes a processor that is coupled to a dedicated line and a host, where the dedicated line is communicatively connected between the first security management circuit and the third security management circuit. The processor is configured to determine an event occurring on the host; according to a type of the determined event, the processor is configured to report the event through the dedicated line.

In an embodiment of the disclosure, a management system adapted to a hierarchy structure including at least three layers is provided. The management system includes a first security management circuit, a second security management circuit, and a third security management circuit. The first security management circuit is located at a first layer of the hierarchy structure. The second security management circuit is located at a second layer of the hierarchy structure. The third security management circuit is located at another layer of the hierarchy structure different from the first layer and the second layer, where the first security management circuit, the second security management circuit, and the third security management circuit are respectively configured to determine an event occurring on a host connected to the first security management circuit, the second security management circuit, and the third security management circuit. The management system further includes a dedicated line communicatively connected between the first security management circuit and the third security management circuit; according to a type of the event determined by the third security management circuit, the third security management circuit reports the event through the dedicated line.

In light of the foregoing, according to the event reporting method, the security management circuit, and the management system provided in one or more embodiments of the disclosure, the security management circuits are deployed in the hierarchy structure, and the security management circuit located at the lower layer reports the event through the dedicated line connected to the first security management circuit, whereby the efficiency of reporting the events and the system security are improved.

In order for the features and advantages of the disclosure to be more comprehensible, the following specific embodiments are described in detail in conjunction with the drawings.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
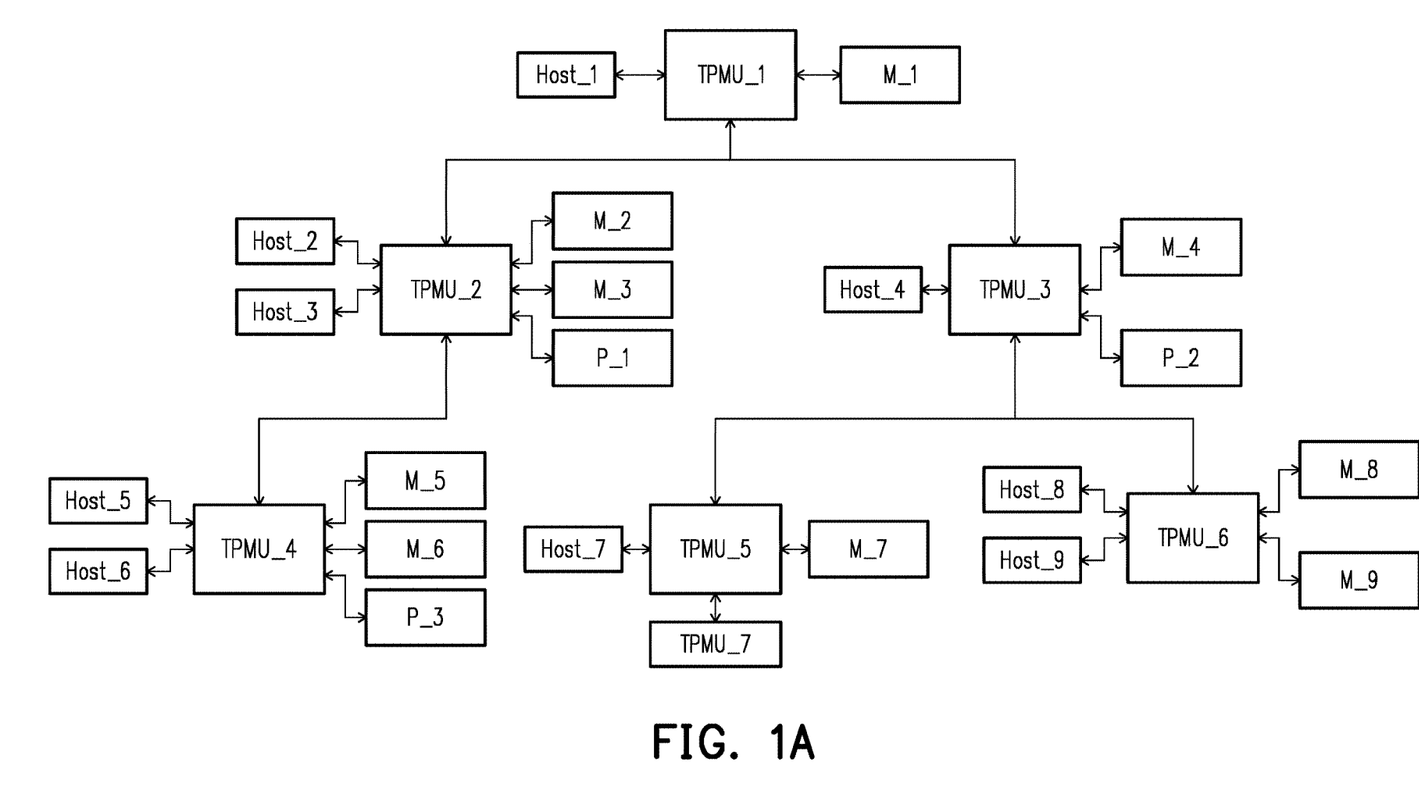
FIG. 1A and FIG. 1B are schematic views illustrating a hierarchy structure according to an embodiment of the disclosure.
Figure 1B:
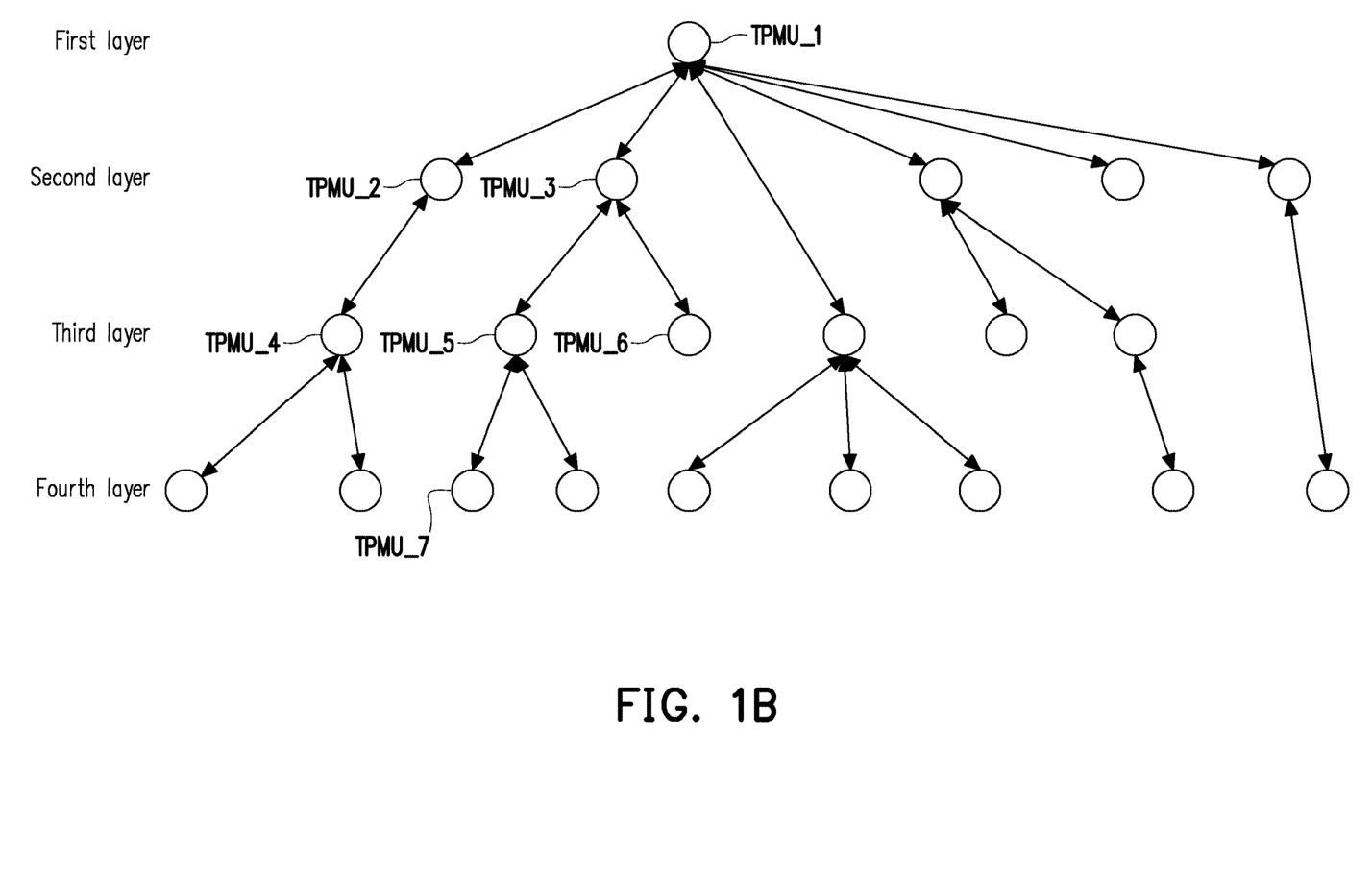

FIG. 1A and FIG. 1B are schematic views illustrating a hierarchy structure according to an embodiment of the disclosure. With reference to FIG. 1A and FIG. 1B, an exemplary hierarchy structure/topology includes (but is not limited to have) four layers; as shown in FIG. 1B, a trusted platform management unit TPMU_1 (the trusted platform management unit is taken as an example herein, while the trusted platform management unit may also be replaced by PFR or other security management circuits) is located at a first layer, trust the platform management units TPMU_2 and TPMU_3 are located at a second layer, trusted platform management units TPMU_4, TPMU_5, and TPMU_6 are located at a third layer, and a trusted platform management unit TPMU_7 is located at a fourth layer.

As shown in FIG. 1A, the trusted platform management unit TPMU_1 may be connected to a host Host_1 and a memory M_1. The trusted platform management unit TPMU_2 may be connected to the host Host_2, a host Host_3, the memory M_2, a memory M_3, and a peripheral device P_1. The trusted platform management unit TPMU_3 may be connected to a host Host_4, a memory M_4, and a peripheral device P_2. The trusted platform management unit TPMU_4 may be connected to a host Host_5, a host Host_6, a memory M_5, a memory M_6, and a peripheral device P_3. The trusted platform management unit TPMU_5 may be connected to a host Host_7 and a memory M_7. The trusted platform management unit TPMU_6 may be connected to a host Host_8, a host Host_9, a memory M_8, and a memory M_9.

The trusted platform management unit TPMU_2 is taken as an example. When the host Host_2 boots up, the trusted platform management unit TPMU_2 may keep the host Host_2 in the rest state or disable the power signal until the trusted platform management unit TPMU_2 has successfully verified an image file for the host Host_2. In addition, the trusted platform management unit TPMU_2 may also monitor a task or data stream between the host Host_2 and the peripheral device P_1, the trusted platform management unit TPMU_2 may also monitor a task or data stream between the host Host_2, the memory M_2 and the memory M_3. If the trusted platform management unit TPMU_2 detects an abnormal behavior, the trusted platform management unit TPMU_2 resets the host Host_2 and end its task.

In the hierarchy structure, the trusted platform management unit located at a master node is also responsible for verifying the trusted platform management units located at its slave node. For instance, the trusted platform management unit TPMU_1 verifies the trusted platform management units TPMU_2 and TPMU_3, the trusted platform management unit TPMU_2 verifies the trusted platform management unit TPMU_4, and the rest may be deduced therefrom. Except for the trusted platform management unit TPMU_1, the other trusted platform management units need to pass the verification of their respective trusted platform management units located at their master nodes before releasing their reset signals or power signals.

In some embodiments, the trusted platform management unit TPMU_1 located at the first layer may be regarded as a ROT of RoTs (RROT) and has the highest privilege or permission in the hierarchy structure. For example, the trusted platform management unit TPMU_1 may be responsible for monitoring and handling all information reported by slave nodes in a tree topology. For instance, if the trusted platform management unit TPMU_4 located at a slave node at the third layer intends to report a problem to the trusted platform management unit TPMU_1 at the first layer, then the problem information is forwarded through the trusted platform management unit TPMU_2 located at the second layer.

Alternatively, the trusted platform management unit TPMU_1 still has the highest privilege but is only responsible for monitoring and handling critical tasks or problems and authorizes other types of tasks to the trusted platform management units located at the other slave nodes for processing. However, even if the trusted platform management unit (e.g., the trusted platform management units TPMU_5-TPMU_7) located at the lower layers (e.g., at the third layer or the fourth layer) intends to report critical problems, the critical problems are still required to be forwarded to the trusted platform management unit TPMU_1 through the trusted platform management unit located at the upper layer (e.g., the trusted platform management units TPMU_2 and TPMU_3). However, when the trusted platform management units, that are located at middle layers and serve to transfer the problem information, are hacked or cracked, the trusted platform management unit TPMU_1 at a root node is unable to receive the problem information from the trusted platform management units at the lower layers, and such an issue may eventually cause the entire system to be hacked or cracked. Therefore, there is a need to solve the aforementioned issue.

Figure 2:
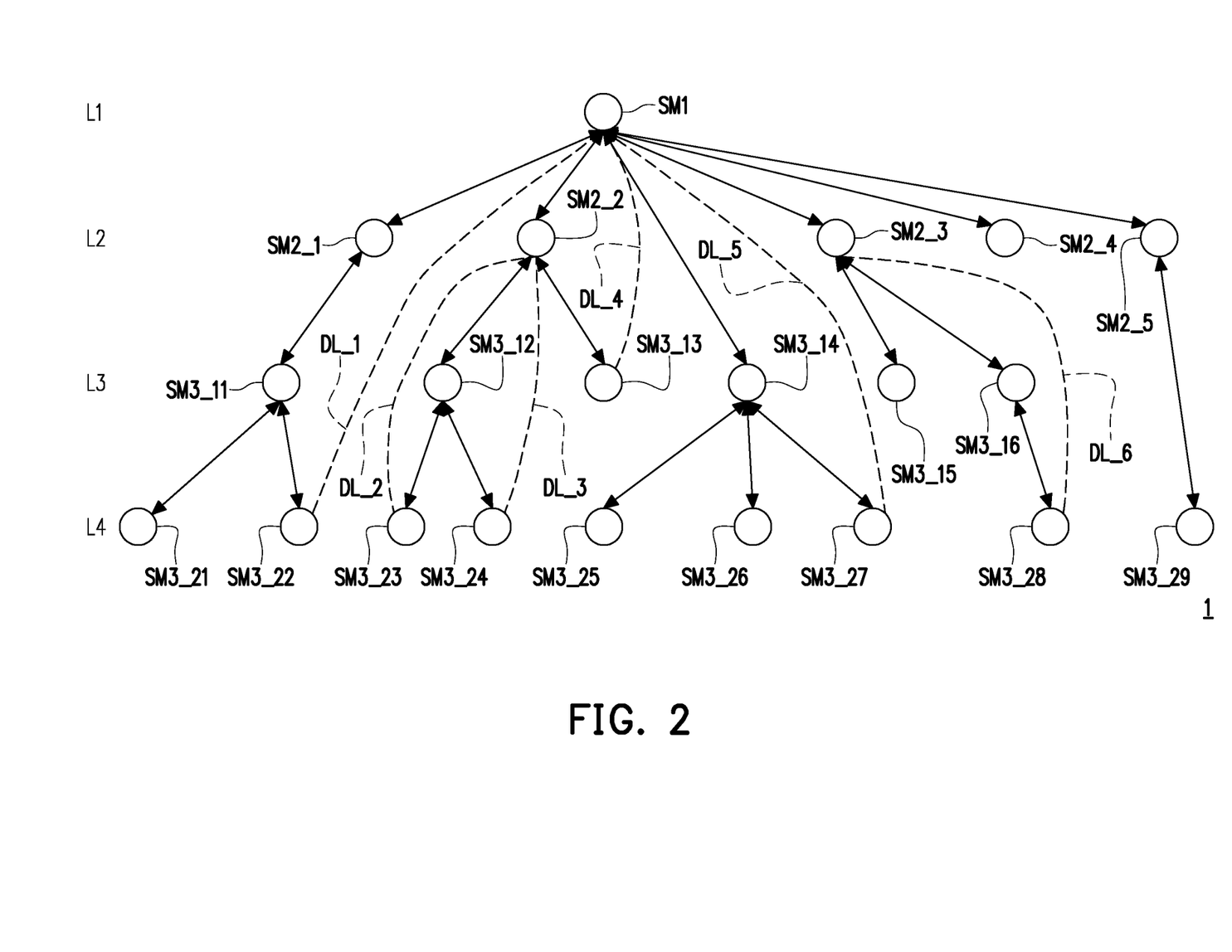
FIG. 2 is a schematic view illustrating a management system according to an embodiment of the disclosure.

FIG. 2 is a schematic view illustrating a management system 1 according to an embodiment of the disclosure. With reference to FIG. 2, the management system 1 includes (but is not limited to) security management circuits SM1, SM2_1-SM2_5, SM3_11-SM3_16, and SM3_21-SM3_29 and dedicated lines DL_1-DL_6. The management system 1 may be applied to a motherboard, a server, a computer, or any other device that may have requirements for trusted platform management. The security management circuits SM1, SM2_1-SM2_5, SM3_11-SM3_16, and SM3_21-SM3_29 are located in the hierarchy structure/topology, e.g., the tree topology shown in the drawings. The hierarchy structure includes three or more layers. For instance, the hierarchy structure in FIG. 2 includes a first layer L1, a second layer L2, a third layer L3, and a fourth layer L4. It should be noted that the quantity of the security management circuits, the number of layers of the hierarchy structure, and the connection manner provided in one or more embodiments of the disclosure are not limited to those provided in the embodiment as shown in FIG. 2.

The security management circuits SM1, SM2_1-SM2_5, SM3_11-SM3_16, and SM3_21-SM3_29 may be TPMUs, ROT circuits, PFR circuits, or other security control circuits.

The security management circuit SM1 is located at the first layer L1 of the hierarchy structure and serves as a root node of the hierarchy structure. The first layer L1, where the security management circuit SM1 is located, is defined as the highest layer and has the highest permission, in FIG. 2, the labeled number of levels increases as the number of layers increases, and the permission owned by the security management circuit decreases as the labeled number of level increases. The security management circuits SM2_1-SM2_5 are located at the second layer of the hierarchy structure. That is, the security management circuit SM1 is the master node of the security management circuits SM2_1-SM2_5, and the security management circuits SM2_1-SM2_5 are the slave nodes of the security management circuit SM1. The security management circuit SM1 is communicatively connected to the second security management circuits SM2_1-SM2_5. The security management circuits SM3_11-SM3_16 are located at another layer of the hierarchy structure different from the first layer and the second layer (i.e., the third layer). The security management circuit SM3_11 is communicatively connected to the security management circuit SM2_1. That is, the security management circuit SM2_1 is the master node of the security management circuit SM3_11, the security management circuit SM3_11 is the slave node of the security management circuit SM2_1, and the rest may be deduced therefrom. The security management circuits SM3_21-SM3_29 are located at another layer (i.e., the fourth layer) different from the first layer, the second layer and the third layer of the hierarchy structure. The security management circuits SM3_21 and SM3_22 are communicatively connected to the security management circuit SM3_11; that is, the security management circuit SM3_11 is the master node of the security management circuits SM3_21 and SM3_22, the security management circuits SM3_21 and SM3_22 are the slave nodes of the security management circuit SM3_11, and the rest may be deduced therefrom. All security management circuits located below the third layer (i.e., all security management circuits located on another layer than the first layer L1 and the second layer L2) have similar and different characteristics against the security management circuits located on the first layer L1 or the second layer L2, so they have similar names, which will be discussed later.

In an embodiment, the level of privilege and/or permission decreases with the increase in the ordinal number of layers. Different privileges and/or permissions indicate different capabilities. However, the functions and/or capabilities of the security management circuits located at the same layer may or may not be the same. In an embodiment, in response to the occurrence of an event, the security management circuit located at the lower layer reports the event to the security management circuit located at the upper layer.

The security management circuits SM1, SM2_1-SM2_5, SM3_11-SM3_16, and SM3_21-SM3_29 may be respectively connected to hosts, memories, and/or peripheral devices. The hosts are not shown in the drawings and may be, for instance, CPUs, board management controllers (BMC), or system on a chip (SoC). The memories are not shown in the drawings and may be, for instance, any type of static memory or dynamic random access memories (RAM). The peripheral devices are not shown in the drawings and may be, for instance, keyboards, mice, displays/display cards, network controllers, or sensors.

The security management circuits SM1, SM2_1-SM2_5, SM3_11-SM3_16, and SM3_21-SM3_29 may respectively include processors, which are not shown in the drawings and may be, for instance, microprocessors, microcontrollers, field-programmable gate arrays (FPGA), or application-specific integrated circuits (ASIC). The processors of the security management circuits SM1, SM2_1-SM2_5, SM3_11-SM3_16, and SM3_21-SM3_29 may execute all or parts of the operations/functions of the security management circuits SM1, SM2_1-SM2_5, SM3_11-SM3_16, and SM3_21-SM3_29. In an embodiment, the security management circuits SM1, SM2_1-SM2_5, SM3_11-SM3_16, and SM3_21-SM3_29 may be implemented in form of chips, modules, or digital circuits. In another embodiment, the functions of the security management circuits SM1, SM2_1-SM2_5, SM3_11-SM3_16, and SM3_21-SM3_29 may also be performed through software. In an embodiment, the security management circuits SM1, SM2_1-SM2_5, SM3_11-SM3_16, and SM3_21-SM3_29 are configured to perform one or more security functions, such as measurement, storage, reporting, verification, and/or updating.

In an embodiment, the security management circuits SM1, SM2_1-SM2_5, SM3_11-SM3_16, and SM3_21-SM3_29 may respectively determine the events occurring on the hosts connected to the security management circuits SM1, SM2_1-SM2_5, SM3_11-SM3_16, and SM3_21-SM3_29, such as software defects, hardware damage, or interface interruptions. The types and/or the contents of the events may still be changed according to actual demands, which should however not be construed as limitations in the embodiments of the disclosure. In another embodiment, the security management circuits SM1, SM2_1-SM2_5, SM3_11-SM3_16, and SM3_21-SM3_29 may also detect or determine whether itself attacked by software or hardware maliciously, and take corresponding steps.

The dedicated lines DL_1~DL_6 may adopt I2C, I3C, control area network (CAN) buses, serial peripheral interfaces (SPI), low pin control (LPC) buses, or other transmission interfaces. In an embodiment, the dedicated lines may be communicatively connected between the security management circuit SM1 located at the first layer L1 and the security management circuits located at layers at and below the third layer L3 (including the third layer L3). As shown in FIG. 2, the dedicated line DL_1 is directly connected to the security management circuit SM1 located at the first layer L1 and the security management circuit SM3_22 located at the fourth layer L4, the dedicated line DL_2 is directly connected to the security management circuit SM2_2 located at the second layer L2 and the security management circuit SM3_23 located at the fourth layer L4, the dedicated line DL_3 is directly connected to the security management circuit SM2_2 located at the second layer L2 and the security management circuit SM3_24 located at the fourth layer L4, the dedicated line DL_4 is directly connected to the security management circuit SM1 located at the first layer L1 and the security management circuit SM3_13 located at the third layer L3, the dedicated line DL_5 is directly connected to the security management circuit SM1 located at the first layer L1 and the security management circuit SM3_27 located at the fourth layer L4, and the dedicated line DL_6 is directly connected to the is security management circuit SM2_3 located at the second layer L2 and the security management circuit SM3_28 located at the fourth layer L4.

It is worth noting that the security management circuits SM3_11-SM3_16 and SM3_21-SM3_29 located at or below the third layer L3 and the first layer L1 are spaced by at least one layer in the hierarchy structure. In order to transmit the important information of the security management circuits SM3_11-SM3_16 and SM3_21~SM3_29 located at or below the third layer L3 to the security management circuit located at the upper layer safely as soon as possible, the dedicated line may cross at least one layer. That is, the dedicated line is directly connected to the security management circuit located at an N-th layer and another security management circuit located at an (N-R)th layer, N is a positive integer greater than two, and R is a positive integer greater than one. Thereby, the security management circuits SM3_11-SM3_16 and SM3_21-SM3_29 located at the lower layer may transmit information to a node at a layer upper than where their master nodes are located through the dedicated line connected to the security management circuits SM3_11-SM3_16 and SM3_21-SM3_29.

The security management circuits SM3_11-SM3_16 and SM3_21-SM3_29 located at and below the third layer L3 may report the event through the dedicated line connected to the security management circuits SM3_11-SM3_16 and SM3_21-SM3_29 according to the type of the event determined by the security management circuits SM3_11-SM3_16 and SM3_21-SM3_29. In an embodiment, when an event is detected on the host connected to the security management circuits SM3_11-SM3_16 and SM3_21-SM3_29, the security management circuits SM3_11-SM3_16 and SM3_21-SM3_29 located at and below the third layer L3 may determine that the type of the event belongs to the important and critical type and report the event whose type belongs to the critical type to the security management circuit with higher permission through the dedicated line. That is, only the event whose type belongs to the critical type is reported through the dedicated line. The critical type is, for instance, an abnormal command from the security management circuit at its master node, or hardware attacks/anomalies including high and low temperature, overclocking, abnormal voltages/currents, abnormal output impedance, or electromagnetic interference suffered by the security management circuit, activation of JTAG function for verification or test or other abnormal configurations, software attacks/anomalies such as software breakdown, abnormal memory usage, counter overflow, or undefined software flow, or interruption of transmission interfaces, such as SPI, I2C or I3C. However, the definition of the critical type may still be changed according to actual needs, which should not be construed as a limitation in one or more embodiments of the disclosure.

Figure 3:
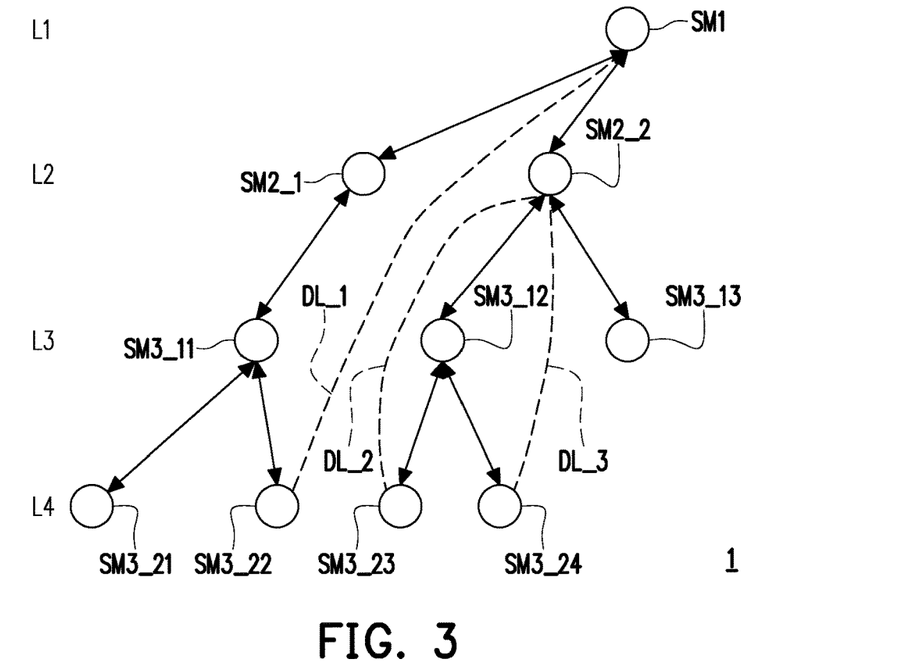
FIG. 3 is a schematic view illustrating a step of reporting through a dedicated line according to an embodiment of the disclosure.

For instance, FIG. 3 is a schematic view illustrating a step of reporting through a dedicated line according to an embodiment of the disclosure. With reference to FIG. 3, when the security management circuit SM3_22 located at the fourth layer L4 detects an overclocking attack from the SPI channel, the security management circuit SM3_22 may immediately report the critical event (associated with the hardware attack) to the security management circuit SM1 located at the first layer L1 through the dedicated line DL_1.

Similarly, if the security management circuit SM3_24 located at the fourth layer L4 detects that the command from the security management circuit SM3_12 located at the third layer L3 is unusually unreasonable, it may indicate that the security management circuit SM3_12 may be hacked or cracked, the security management circuit SM3_24 may notify the security management circuit SM2_2 of that abnormal command through the dedicated line, and the security management circuit SM2_2 would become the arbitrator. For instance, in general, a JTAG function of the security management circuit in a shipped product are prohibited or disabled, and the JTAG function may only be enabled during the research and development stage. If the security management circuit SM3_12 requires the security management circuit SM3_24 to enable the JTAG function, the security management circuit SM3_24 should understand that the command is malicious or unexpected. After that, since the security management circuit SM3_12 is not trusted, the security management circuit SM3_24 may report the event associated with the abnormal command to the security management circuit SM2_2 through the dedicated line DL_3, and the corresponding processing is made by the security management circuit SM2_2. In some embodiments, the security management circuit SM2_2 may disable all functions of the security management circuit SM1_2 through the hardware signal directly and take over the management of all security management circuits SM3_23~SM3_24 below the security management circuit SM3_12 through the dedicated lines DL_2 and DL_3.

In addition, according to one or more embodiments of the disclosure, system security recovery may be enhanced. For instance, the security management circuit SM3_12 is connected to (and monitors) BMC, the security management circuit SM3_23 is connected to (and monitors) X86 CPU, and the security management circuit SM3_24 is connected to (and monitors) another X86 CPU. If the security management circuit SM3_12 or the BMC connected to the security management circuit SM3_12 is damaged or cracked, the security management circuit SM2_2 may take over the management of the task of the security management circuit SM3_12 through the dedicated lines DL_2 and DL_3 and directly control the security management circuits SM3_23 and SM3_24 accordingly. Thereby, the security management circuits SM3_23 and SM3_24 or the CPUs connected to the security management circuits SM3_23 and SM3_24 may continue to complete the rest of the task. For instance, the administrator is notified of the shutdown information or required to follow the sequence of termination of the current processing task to prevent the direct shutdown from causing damages to the related hardware.

In other embodiments, note that not only the event belonging to the critical type but also an event belonging to a type defined by a user as being required to be reported through the dedicated line may be reported.

Depending on different design requirements, the security management circuit located at the upper layer (e.g., the first layer L1 or the second layer L2 as shown in FIG. 2) may have insufficient pins to be connected to the dedicated line. Under this condition, the bus communication protocol of the dedicated line which needs more connection pins may be replaced by a communication protocol with fewer connection pins. However, the demand for the dedicated line may still increase together with the increase in the quantity of the connected security management circuits, and thus it may be difficult to cope with the demand only by changing the communication protocol.

Figure 4:
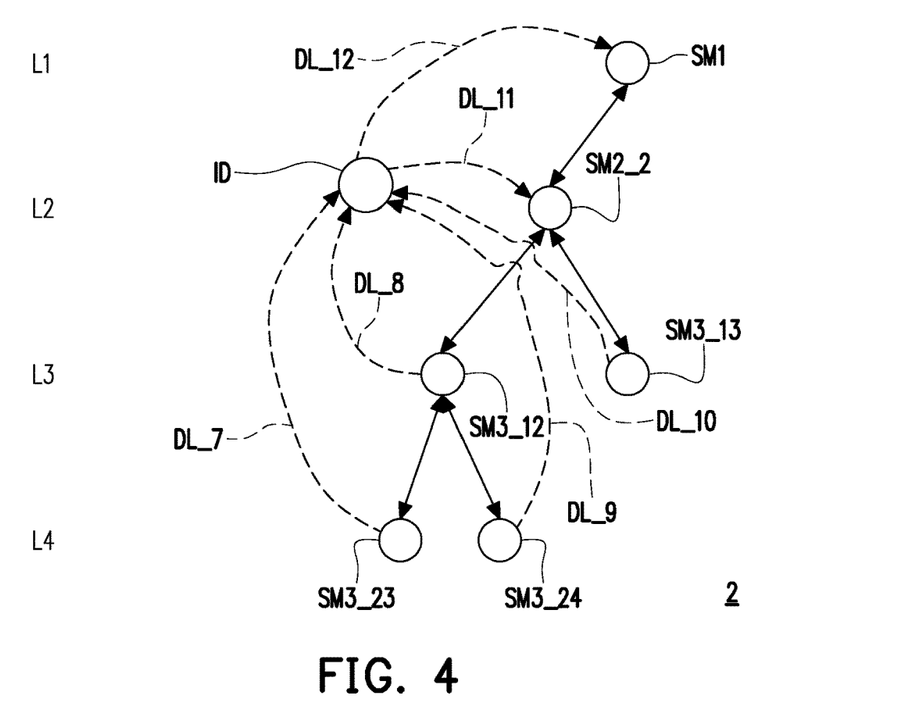
FIG. 4 is a schematic view illustrating a management system according to another embodiment of the disclosure.

Therefore, a relay circuit is further provided according to one or more embodiments of the disclosure. FIG. 4 is a schematic view illustrating a management system 2 according to another embodiment of the disclosure. With reference to FIG. 4, the difference between the embodiment in FIG. 2 or FIG. 3 and the present embodiment lies in that the management system 2 further includes a relay circuit ID. The relay circuit ID is directly connected to the dedicated lines DL_7, DL_8, DL_9, and DL10 from the security management circuits SM3_23, SM3_24, SM3_12, and SM3_13, respectively and is further communicatively connected to the security management circuit SM1 located at the first layer L1 (e.g., directly connected through the dedicated line DL_12). In some embodiments, the relay circuit ID may also be directly connected to the dedicated line DL_11 from the security management circuit SM2_2.

The relay circuit ID may be a microprocessor, a chip, a controller, a configured digital circuit (FPGA), or ASIC. In an embodiment, the function of the relay circuit ID may also be implemented in form of software or firmware.

The relay circuit ID may receive an event reported by the security management circuit (e.g., the security management circuits SM3_12, SM3_13, SM3_23, and SM3_24) located at or below the third layer L3. In addition, the relay circuit ID may transmit the event information received through the dedicated line DL_12 to the security management circuit SM1 located at the first layer L1. Similarly, the security management circuits SM3_12, SM3_13, SM3_23, and SM3_24 may only report the events belonging to the critical type to the relay circuit ID, but the type of the event which may be reported through the relay circuit ID may also be defined according to actual demand. In another embodiment, the relay circuit ID also could be designed to report the event from the security management circuit located at or below the third layer L4 to the security management circuit located at the upper layer. For instance, the relay circuit ID may transmit the event information received through the dedicated line DL_11 to the security management circuit SM2_2 located at the second layer L2, but not only report to the first layer L1.

It is worth noting that the event information of the event may be notified through the dedicated line by merely using a simple communication protocol, in one embodiment, by merely using binary information or one-bit information. In another embodiment, if the relay circuit ID is used, a high-level communication protocol that needs more connection pins would be used by the dedicated line to transfer more important notification event, the relay circuit ID may combine the event information for notification of the event with identification information. For instance, the relay circuit ID encodes or packages the event information (where the encoding, packaging algorithm, or format is not limited) to generate combined information that combines the event information and the identification information. The identification information serves to distinguish the event information. The identification information includes at least one of an identification code of the security management circuit transmitting the event information, the type of the event, or contents of the event.

For instance, Table (1) is an example which illustrates the data structure of the identification information:

TABLE 1

| Identification code (TPMU_ID) of the security management circuit) | Type of issue/event (ISSUE_TYPE)) | Identification code of the issue/event (ISSUE_ID)) | Contents of the issue/event (ISSUE_CONTENT)) |
| --- | --- | --- | --- |

The identification code of the security management circuit serves to identify which the security management circuit reports the event, the type or the identification code of the issue/event serves to identify the event, and the contents of the issue/event serve to further explain the issue/event (optional). In some application scenarios, the type of issue/event includes a hardware type and a software type.

In an embodiment, the identification information may also be information including an event time, an occurrence frequency, or information related to the connected host. However, the contents of the identification information may still be changed according to actual demands.

In some application scenarios, the relay circuit ID may receive a plurality of event information at the same time. That is, the relay circuit ID may receive reports of a plurality of events. In an embodiment, the relay circuit ID may allocate the plurality of event information to the same timeslot or different timeslots and transmit the plurality of event information to the corresponding security management circuit at the same time or in batches.

In another embodiment, the relay circuit ID may temporarily store a plurality of event information from the security management circuits located at or below the third layer L3 (e.g., the security management circuits SM3_12, SM3_13, SM3_23, and SM3_24) in a buffer.

Then, when the relay circuit ID receives multiple pieces of event information, the relay circuit ID may then sort the multiple pieces of event information at the same time and transmit the multiple pieces of event information sequentially according to the sorted result of the plurality of event information. In an embodiment, the relay circuit ID may define the priority of the security management circuit and/or the event information. In response to the received event information, the relay circuit ID determines the priority of the security management circuit and/or the event information and sort a plurality of event information according to the priority.

For instance, Table (2) illustrates the priority of different event information or types:

TABLE 2

| Priority | Type of the event/event information |
| --- | --- |
| 1 | Abnormal command |
| 2 | Hardware attack/anomaly |
| 3 | Abnormal configuration |
| 4 | Software attack/anomaly |
| 5 | Interruption of transmission interface |

Based on Table (2), another application scenario is provided for explanation. With reference to FIG. 4, at the same time, the security management circuit SM3_23 receives an abnormal command from the security management circuit SM3_12, and the security management circuit SM3_24 detects an abnormal SPI clock frequency. The security management circuits SM3_23 and SM3_24 may report their respective events/issues to the relay circuit ID at the same time. Since the security management circuit SM3_24 is able to detect the clock issue and thus interrupts the SPI transmission by itself, and the priority of such an event is relatively low, the relay circuit ID may first report the event of the abnormal command from the security management circuit SM3_23 to the security management circuit SM1 or SM2_2. Then, the relay circuit ID reports the event of the abnormal SPI clock frequency from the security management circuit SM3_24.

In addition to priority sorting, note that a first in first out (FIFO) method, round-robin method or other queue scheduling algorithms may also be applied to sort a plurality of event information.

In an embodiment, the dedicated line or the relay circuit ID may communicate bidirectionally. In addition to reporting the event by the security management circuit located at the lower layer to the security management circuit located at the upper layer, the security management circuit located at the upper layer may also communicate with the security management circuit located at the lower layer through the dedicated line or the relay circuit ID. For instance, the security management circuit SM1 located at the first layer L1 transmits a command to the security management circuit SM3_12 located at the third layer L3.

Figure 5:
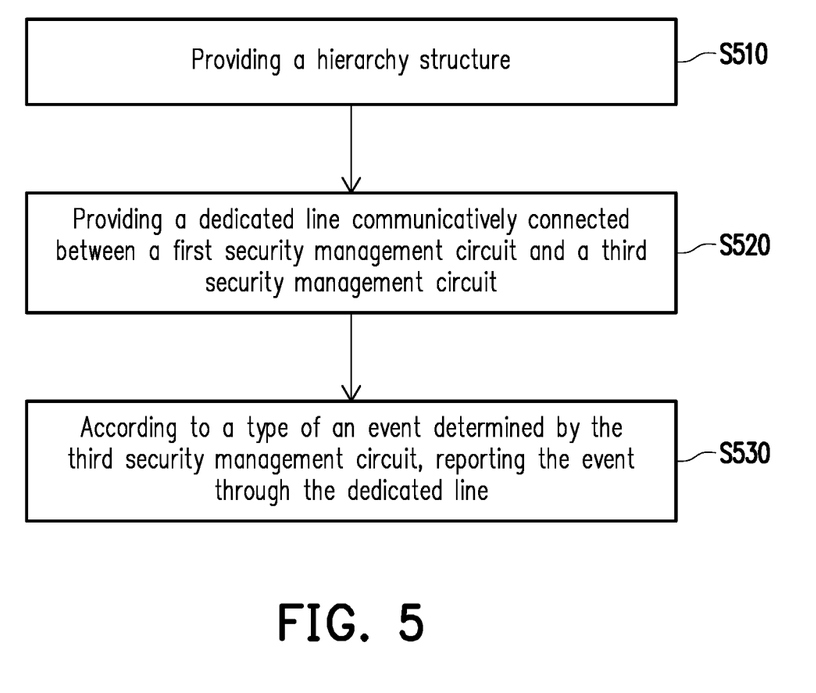
FIG. 5 is a flowchart illustrating an event reporting method according to an embodiment of the disclosure.

FIG. 5 is a flowchart illustrating an event reporting method according to an embodiment of the disclosure. With reference to FIG. 5, a hierarchy structure is provided (step S510). The hierarchy structure includes at least three layers. A first security management circuit is located at a first layer of the hierarchy structure, a second security management circuit is located at a second layer of the hierarchy structure, and a third security management circuit is located at another layer of the hierarchy structure different from the first layer and the second layer. The first security management circuit is communicatively connected to the second security management circuit, and the first security management circuit, the second security management circuit, and the third security management circuit are respectively configured to determine an event occurring on a host respectively connected to the first security management circuit, the second security management circuit, and the third security management circuit. A dedicated line communicatively connected between the first security management circuit and the third security management circuit is provided (step S520). According to a type of the event determined by the third security management circuit, the event is reported through the dedicated line (step S530).

The implementation details of each step in FIG. 5 are already described in detail in the embodiments and the implementation manner provided above and thus will not be repeated hereinafter. In addition to being implemented in form of a circuit, each step and implementation details provided in one or more embodiments of the disclosure may also be implemented in form of software by a processor, which should not be construed as a limitation in the disclosure.

To sum up, in the event reporting method, the security management circuit, and the management system provided in one or more embodiments of the disclosure, the security management circuit located at the lower layer may directly report the event to the security management circuit located at the upper layer through the dedicated line. Thereby, the reporting efficiency and the security may be improved. In order to improve expandability and practicality, the relay circuit is applied to schedule a plurality of event information according to one or more embodiments of the disclosure and solve the practical problem of the single chip with limited pins.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An event reporting method, comprising:
   providing a hierarchy structure, wherein the hierarchy structure comprises at least three layers, a first security management circuit is located at a first layer of the hierarchy structure, a second security management circuit is located at a second layer of the hierarchy structure, a third security management circuit located at another layer of the hierarchy structure different from the first layer and the second layer, the first security management circuit is communicatively connected the second security management circuit, and the first security management circuit, the second security management circuit, and the third security management circuit are respectively configured to determine an event occurring on a host connected to the first security management circuit, the second security management circuit, and the third security management circuit;
   providing a dedicated line communicatively connected between the first security management circuit and the third security management circuit; and
   according to a type of the event determined by the third security management circuit, reporting the event through the dedicated line.

2. The event reporting method according to claim 1, wherein the dedicated line is directly connected the third security management circuit located at an N-th layer and another third security management circuit located at an (N-R)th layer, N is a positive integer greater than two, and R is a positive integer greater than one.

3. The event reporting method according to claim 1, wherein the dedicated line is directly connected a relay circuit, the relay circuit is communicatively connected to the first security management circuit, and the step of reporting the event through the dedicated line according to the type of the event determined by the third security management circuit comprises:
   receiving the event reported by the third security management circuit through the relay circuit.

4. The event reporting method according to claim 1, wherein the step of reporting the event through the dedicated line according to the type of the event determined by the third security management circuit comprises:
   combining event information for notification of the event with identification information, wherein the identification information comprises at least one of an identification code of the third security management circuit, the type of the event, or contents of the event; and
   transmitting combined information combining the event information and the identification information to the first security management circuit.

5. The event reporting method according to claim 3, wherein the step of reporting the event through the dedicated line according to the type of the event determined by the third security management circuit comprises:
   combining event information for notification of the event with identification information, wherein the identification information comprises at least one of an identification code of the third security management circuit, the type of the event, or contents of the event; and
   transmitting combined information combining the event information and the identification information to the first security management circuit.

6. The event reporting method according to claim 1, wherein the step of reporting the event through the dedicated line according to the type of the event determined by the third security management circuit comprises:
   temporarily storing a plurality of event information from the third security management circuit and a fourth security management circuit;
   sorting the plurality of event information; and
   sequentially transmitting the plurality of event information according to the sorted result.

7. The event reporting method according to claim 3, wherein the step of reporting the event through the dedicated line according to the type of the event determined by the third security management circuit comprises:
   temporarily storing a plurality of event information from the third security management circuit and a fourth security management circuit;
   sorting the plurality of event information; and sequentially transmitting the plurality of event information according to the sorted result.

8. The event reporting method according to claim 1, wherein the step of reporting the event through the dedicated line according to the type of the event determined by the third security management circuit comprises:
   determining that the type belongs to a critical type; and
   reporting the event whose type belongs to the critical type through the dedicated line.

9. A third security management circuit, wherein a hierarchy structures comprises at least three layers, a first security management circuit is located at a first layer of the hierarchy structure, a second security management circuit is located at a second layer of the hierarchy structure, a third security management circuit is located at another layer of the hierarchy structure different from the first layer and the second layer, the first security management circuit is communicatively connected to the second security management circuit, and the third security management circuit comprises:
   a processor, coupled to a dedicated line and a host, wherein the dedicated line is communicatively connected between the first security management circuit and the third security management circuit, and the processor is configured to:
      determine an event occurring on the host; and
      according to a type of the determined event, report the event through the dedicated line.

10. A management system, adapted to a hierarchy structure comprising at least three layers and comprising:
   a first security management circuit, located at a first layer of the hierarchy structure;
   a second security management circuit, located at a second layer of the hierarchy structure and communicatively connected to the first security management circuit;
   a third security management circuit, located at another layer of the hierarchy structure different from the first layer and the second layer, wherein the first security management circuit, the second security management circuit, and the third security management circuit are respectively configured to determine an event occurring on a host connected to the first security management circuit, the second security management circuit, and the third security management circuit; and
   a dedicated line, communicatively connected between the first security management circuit and the third security management circuit, wherein
   according to a type of the event determined by the third security management circuit, the third security management circuit reports the event through the dedicated line.

11. The management system according to claim 10, wherein the dedicated line is directly connected the third security management circuit located at an N-th layer and another third security management circuit located at an (N-R)th layer, N is a positive integer greater than two, and R is a positive integer greater than one.

12. The management system according to claim 10, further comprising:
   a relay circuit, directly connected to the dedicated line and further communicatively connected to the first security management circuit and
   receiving the event reported by the third security management circuit.

13. The management system according to claim 12, wherein the relay circuit combines event information for notification of the event with identification information, the identification information comprises at least one of an identification code of the third security management circuit, the type of the event, or contents of the event, and the relay circuit transmits combined information combining the event information and the identification information to the first security management circuit.

14. The management system according to claim 12, wherein the relay circuit temporarily stores a plurality of event information from the third security management circuit and a fourth security management circuit, sorts the plurality of event information, and sequentially transmits the plurality of event information according to the sorted result.

15. The management system according to claim 10, wherein the third security management circuit determines that the type of the event belongs to a critical type and reports the event whose type belongs to the critical type through the dedicated line.

\* \* \* \* \*